United States Patent

Saidi et al.

[11] Patent Number: 6,103,419
[45] Date of Patent: Aug. 15, 2000

[54] SOLID SECONDARY LITHIUM CELL BASED ON LITHIATED ZIRCONIUM, TITANIUM OR HAFNIUM OXIDE CATHODE MATERIAL

[75] Inventors: M. Yazid Saidi; Jeremy Barker, both of Henderson, Nev.; Rene Koksbang, Odense, Denmark

[73] Assignee: Valence Technology, Inc., Henderson, Nev.

[21] Appl. No.: 08/708,232

[22] Filed: Sep. 6, 1996

[51] Int. Cl.[7] .................................................. H01M 4/48
[52] U.S. Cl. .............................................................. 429/218
[58] Field of Search ...................................... 429/218, 194

[56] References Cited

U.S. PATENT DOCUMENTS

| | | | |
|---|---|---|---|
| 5,478,674 | 12/1995 | Miyasaka | 429/218 |
| 5,491,039 | 2/1996 | Shackle | 429/194 |

FOREIGN PATENT DOCUMENTS

| | | | |
|---|---|---|---|
| 6-275265 | 9/1994 | Japan | H01M 4/52 |

OTHER PUBLICATIONS

Murakami et al. "Secondary lithium batteries with improved cathodes" Chemical Abstracts Assession No. 125:226584 CA, JP 08180875 A2, Jul. 1996.

Kato et al., "Secondary lithium batteries with improved electrodes" Chemical Abstracts Accession No. 125:226583 CA JP 08180874 A2, Jul. 1996.

Huanosta et al. "Dielectric properties of a new family of complex oxides of the type Li2ABO4" Chemical Abstracts Accession No. 113:202943 Rev. Mex. Fis. (1990) 36 (2) 258–65 Month unavailable.

*Primary Examiner*—Stephen Kalafut
*Assistant Examiner*—Carol Chaney
*Attorney, Agent, or Firm*—Joseph Ress

[57] ABSTRACT

Provided by the present invention is a new cathode material comprised of a lithiated zirconium, titanium or hafnium oxide. The oxide is of the formula $Li_2MXO_4$, where M is preferably a transition metal such as Ni, Co, Fe, Mn, V, Cu, or Cr, and X is zirconium, titanium or hafnium. The cathode material provides a useful composite cathode when combined with a polymeric binder and carbon.

21 Claims, No Drawings

SOLID SECONDARY LITHIUM CELL BASED ON LITHIATED ZIRCONIUM, TITANIUM OR HAFNIUM OXIDE CATHODE MATERIAL

FIELD OF THE INVENTION

The present invention relates to electrochemical devices and, more particularly, provides a lithiated zirconium, titanium or hafnium oxide material as a cathode active material for use in secondary electrochemical cells.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC_6$. In the operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abusive conditions. Also, because lithium is reincorporated into the anode by intercalation rather than by plating, dendritic and spongy lithium growth does not occur. Non-aqueous lithium electrochemical cells are discussed, for example, in U.S. Pat. Nos. 4,472,487, 4,668,595 and 5,028,500. These cells are often referred to as "rocking chair" batteries because lithium ions move back and forth between the intercalation compounds during charge/discharge cycles.

U.S. Patent 4,770,960 reports a lithium liquid electrolyte cell using a cathode active material which is the complex oxide $LiCo_{1-x}Ni_xO_2$ made from calcined mixtures of $Li_2CO_3$, $CoCO_3$ and $NiCO_3$. In such cells, the discharge capacity decreases with the increase in nickel content for $x>0.27$. The recommended cathode active materials are therefore those having $0<x\leq 0.27$.

U.S. Pat. No. 5,053,297 discloses cathode active materials which contain as a primary active material a first lithium compound having an electrochemical potential which is more noble than the electrochemical potential of the current collector, and an auxiliary active material which is a second lithium compound having an electrochemical potential which is more base than the electrochemical potential of the current collector. Examples include physical mixtures of $LiNiO_2$ and $LiCoO_2$, as well as, chemical mixtures i.e. $LiNi_{0.95}Co_{0.05}O_2$, for use in lithium liquid electrochemical cells. The electrolyte may alternatively be a gel electrolyte. The addition of auxiliary active material decreases the battery energy density. The preferred anode is a carbon material.

European parent application 91119471.0 (Publication 0486950A1) discloses a liquid electrolyte secondary lithium cell having an intercalation carbon anode and a cathode which comprises a lithium-containing metal complex oxide of the formula $Li_xMO_2$, wherein x is $0.5\leq x\leq 1$ and M is selected from the group Co, Ni and Mn. Examples of the metal complex oxides include $LiCoO_2$, $LiNiO_2$, $LiNi_yCo_{1-y}O_2$, ($0<y<1$), $LiMn_2O_4$ and mixtures thereof. The cathode active material is ordinarily used in combination with a conductive agent such as graphite and a binder therefor such as polyvinylidene fluoride. The average discharge voltage of the cell is about 3.6 volts.

U.S. Pat. No. 5,429,890 discloses a secondary lithium electrochemical cell having a cathode which comprises a physical mixture of $Li_xM_nO_2$ (Spinel) and at least one lithiated metal oxide selected from $Li_xNiO_2$ and $Li_xCoO_2$, wherein $0<x\leq 2$. The disclosures of each of the foregoing references is incorporated herein in its entirety.

While the technology involving rocking chair batteries has provided the industry with a viable alternative, potential drawbacks to rocking chair batteries, however, include lower energy density compared to lithium metal cells. Providing new high capacity, high voltage cathode materials would help to overcome such drawbacks and could provide the industry with an even more powerful and useful battery.

It is therefore an object of the present invention to provide a novel cathode material which can provide high capacity, high voltage batteries.

Another object of the present invention is to provide such high capacity batteries.

These and other objects of the present invention will become apparent upon a review of the following specification and the claims appended thereto.

SUMMARY OF THE INVENTION

In accordance with the foregoing objectives, there is provided by the present invention a new cathode material comprised of a lithiated zirconium, titanium or hafnium oxide. The oxide is of the formula $Li_2MXO_4$, where M is Ni, Co, Fe, Mn, V, Cu, Cr, or a mixture thereof, and X is zirconium, titanium or hafnium. The cathode material provides a useful composite cathode when combined with a polymeric binder and carbon, with specific capacities of 230 mAh/g or higher believed possible. Use of the cathode in a secondary electrochemical cell can provide a cell having a high operating voltage of at least 4 volts, and typically as high as 4.2 volts or higher.

Among other factors, the present invention is at least in part based upon the recognition that certain lithiated zirconium, titanium or hafnium oxides may provide high capacity cathode materials. Such high capacities can make, for example, lithium batteries, more powerful and useful to the industry. The use of such materials in electrochemical cells has heretobefore been unknown.

DETAILED DESCRIPTION OF THE PREFERRED EMBODIMENTS OF THE INVENTION

The present invention is directed to a novel cathode material useful in preparing a cathode suitable for use in electrochemical devices, particularly electrochemical cells.

The cathode material of the present invention comprises a lithiated zirconium, titanium or hafnium oxide of the formula $Li_2MXO_4$, with M representing a transition metal, and more preferably Ni, Co, Fe, V, Mn, Cu or Cr, or a mixture of the metals, and X representing zirconium, titanium or hafnium. For purposes of economics, ease of manufacture and/or specific capacity offered by the material, M is preferably Ni, V, Co, Fe, Cu or Mn. It is also preferred that X is zirconium, primarily for economic reasons.

The lithiated zirconium, titanium or hafnium oxide materials can be synthesized using known methods. For example, see "New Family of Phases, $Li_2MXO_4$:X=Zr, Hf; M=Mg, Mn, Fe, Co, Ni, Cu, Zn with $\alpha$-$LiFeO_2$ and Related Structures", by M. Castellanos, M-Chavez Martinez and A. R. West, *Zeitschrift für Kristallographie,* 190 p. 161–169 (1990), which is expressly incorporated herein by reference in its entirety. The materials can be prepared using a solid state reaction of oxide starting materials. For example, stock quantities of $Li_2ZrO_3$, $Li_2TiO_3$ and $Li_2HfO_3$ can be prepared by reacting $Li_2CO_3$ and $ZrO_3$, $TiO_3$ or $HfO_3$. The product is then reacted with the appropriate oxide, e.g., CuO, to form the final product. The optimum time and temperature for each specific compound can vary from 1000° to in excess of 1400° C. for the reaction temperature and from 0.5 to 24 hours for the reactor time. Generally, as the reaction temperature increases, the reaction time needed decreases.

An alternative method for preparing the lithiated oxide materials of the present invention involves heating an intimate mixture of all the oxide materials. For example, $ZrO_2$, CuO and $Li_2CO_3$ are thoroughly mixed and heated to achieve as a final product $Li_2CuZrO_4$.

The prepared lithiated zirconium, titanium or hafnium oxide can then be mixed with a polymeric binder and a carbon material to form the cathode material. The cathode material can then be made into a cathode using conventional techniques.

The cathode active material of the present invention may be mixed or diluted with any other cathode active material, electronically conducting material, solid electrolyte or compatible inert material. The cathode is readily fabricated from individual or mixed cathode active materials.

Preferred electrochemical cells include: a cathode comprised of the active material of the present invention, an intercalation based carbon anode, with each electrode capable of reversibly incorporating (e.g., intercalating) an alkali metal ion, and a polymeric matrix containing an electrolyte solution comprising an organic electrolyte solvent and a salt of the alkali metal. Each electrode preferably has a current collector. The electrochemical cells and batteries use lithium and salts thereof.

The anode used in the electrochemical devices of the present invention generally comprises an anode film that is laminated onto one or both sides of the current collector which is a thin metal foil or grid. Typically, each anode film is from about 100 $\mu$m to about 250 $\mu$m in thickness, preferably about 110 $\mu$m to about 200 $\mu$m, and more preferably about 125 $\mu$m to about 17 $\mu$Am.

Similarly, the cathode used in the electrochemical devices of the present invention generally comprises a cathode film that is laminated onto one or both sides of the cathode current collector, which is a thin metal foil or grid. Typically, each cathode film is from about 100 $\mu$m to about 200 $\mu$m in thickness, preferably about 130 $\mu$m to about 175 gm, and more preferably about 140 $\mu$m to about 165 $\mu$m.

The anode and cathode each also includes a current collector that comprises, for example, a screen, grid, expanded metal, woven or non-woven fabric, or knitted wire formed from an electron conductive material such as metals or alloys. Particularly preferred current collectors comprise perforated metal foils or sheets. Preferably, the current collector has a thickness from about 25 $\mu$m to about 75 $\mu$m, preferably about 35 $\mu$m to about 65 $\mu$m, and more preferably about 45 $\mu$m to about 55 $\mu$m. In order to minimize the weight of the electrochemical cell, thin current collectors are preferred. It is expected that a current collector having a thickness of about 12.5 $\mu$m can be employed. Each current collector is also connected to a current collector tab which extends from the edge of the current collector. The current collector tab is integral to the current collector. By integral is meant that the body of the current collector and tab form a unit, that is, they are not separate members that are attached (e.g., welded) together. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

In further describing the present invention, particularly as it relates to electrochemical cells, the following terms will be defined for purposes of the subject invention.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of a plasticizer including compatibility with the components of the electrochemical cell precursor, processability, low polymer solubility and extractability, liquid solvents, e.g., diethyl ether, or dense gases for example. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and a polymeric matrix. The anode and/or cathode may each include a current collector. The polymeric matrix can function as a separator between the anode and cathode.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and polymeric layer comprising an electrolyte solution interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985, each of which is incorporated herein by reference.

The term "a solid matrix forming monomer" refers to inorganic or organic materials which in monomeric form can be polymerized, preferably the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S Pat. No. 4,908,283), urethane acrylate, vinyl suffonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed, for example, by Abraham et al., Proc. Int. Power Sources Symp., 34th. pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonates) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidene difluoride and hexafluoropropylene dissolved in acetone or other suitable solvent(s). Upon casting the solution, the solvent is evaporated to form the solid polymeric matrix. The solution may be casted directly onto a current collector. Alternatively, the solution is cast onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte, preferably, from about 10 to 20 weight percent, and even more preferably about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the life of the electrolyte/battery. Typical examples of suitable solvents are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. when using propylene carbonate based electrolytes in an electrolytic cell with graphite anodes, a sequestering agent, such as a crown ether, is added in the electrolyte.

The term "organic carbonates" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one- 1,3-dioxolan-2-one; 4,4-dimethyl-1,3-dioxan-2-one; 5,5-dimethy-1-1,3-dioxan-2-one; 5-methyl-1,3-dioxan-2-one; 4-methyl-1,3-dioxan-2-one; 5,5-diethyl-1,3-dioxan-2-one; 4,6-dimethyl-1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. The cathode of the present invention includes the lithiated transition metal zirconium, titanium or hafnium oxides of the present invention, but may also include other cathodic materials. Such other cathodic materials may include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$. lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. No. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-α-$MnO_2$ ($0\leq y<1$) which is $Li_yNH_4Mn_8O_{16}$ ($0\leq y<1$) which has a hollandite-type structure. $Li_y$-α-$MnO_2$ where $0\leq y<0.5$ is preferred. α$MnO_2$ can be synthesized by precipitation from a reaction between a $MnSO_4$ solution and $(NH_4)_2S_2O_8$ as an oxidizing agent.

Lithiation (also referred to as "prelithiation") of α$MnO_2$ can be accomplished via a solid state reaction:

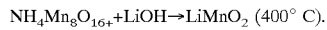

$NH_4Mn_8O_{16+}+LiOH \rightarrow LiMnO_2$ (400° C).

Li-α-$MnO_2$ retains the same structure as Hollandite. See, Botkovitz et. al., J. of Power Sources, 4344 (1993) 657–665, which is incorporated herein, for a discussion of the structure and electrochemical characteristics of Li-α-$MnO_2$. $Li_y$-α-$MnO_2$ $0\leq y<0.5$ is commercially available from SEDEMA, Tertre, Belgium.

In another preferred embodiment, the compatible cathodic material of the present invention is mixed with an electroconductive material including, by way of example, graphite, powdered carbon, powdered nickel, metal particles, conductive polymers (i.e., characterized by a conjugate network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 1.5 weight percent. The percentage of salt depends on the type of salt and electrolytic solvent employed.

The electrolyte composition typically comprises from 0 to about 80 weight percent electrolyte solvent based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive cathode active material can be adapted to form cathode structures in prior art electrochemical cells. Example 1 describes two proposed syntheses of $Li_2CuZrO_4$. Examples 2 and 3 describe a process of preparing the anode and cathodes, respectively. Example 4 describes proposed procedures for fabricating a solid electrolytic cell.

The invention will be described using the anode and cathode structures wherein films (i.e., electrode materials) are laminated on both surfaces of the current collectors, however, it is understood that the invention is applicable to other configurations, for instance, where only one surface of the anode and/or cathode current collector is laminated.

EXAMPLE 1

A stock quantity of $Li_2ZrO_3$ can be prepared by reacting equimolar mixtures of $Li_2Co_3$, and $ZrO_2$ in a Pt crucible in a muffle furnace. An initial temperature of from 600°–700° C. can be used for the first few hours to expel $CO_2$, followed by 900° C. for 1–2 days. The prepared $Li_2ZrO_3$ can then be mixed with the appropriate metal oxide, for example, CuO, and reacted in Pt foil boats or envelopes. The $Li_2CuZrO_4$ product can then be recovered upon cooling.

In an alternative preparation, $Li_2CuZrO_4$ may be prepared from an intimate mixture of $ZrO_2$, CuO and $Li_2CO_3$. For example, the reactants are ground and thoroughly mixed in an acetone bath for about 25 minutes, pelletized and ramped to 800° C. at a rate of 3° C./minute. The temperature is held at 800° C. for 12 hours, and then ramped at 2° C./minute to 1150° C. and held there for 24 hours. $O_2$ is passed through the chamber at a rate of 10 cc/minute. The $Li_2CuZrO_4$ product can then be recovered after cooling slowly at a rate of 10° C./minute.

The foregoing procedures can be used to prepare a lithiated hafnium or titanium oxide by substituting $Li_2HfO_3$ or $Li_2TiO_3$ for the $Li_2ZrO_3$. Lithiated oxides containing different M metals can also be prepared by substituting the appropriate metal oxide (or oxides) for the CuO. For example, $Li_2FeZrO_4$ can be made in the same manner by using FeO instead of CuO.

EXAMPLE 2

An anode current collector can be employed which is a sheet of expanded copper metal that is about 50 Jim thick. It is available under the designation 2Cu5-125 (flatten) from Delker, Corp. in Branford, Conn. The anode slurry can be prepared as follows:

A polymer mixture comprising a copolymer of polyvinylidene difluoride (PVDF) and hexafluoropropylene (HFP) may be prepared by mixing 6.8 grams of the copolymer in 20 grams of acetone. The copolymer (ave. MW 125K) can be Kynar Flex 2801™ from Elf Atochem North America, in Philadelphia, Pa. The mixture may be stirred for about 24 hours in a milling jar available from VWR Scientific, in San Francisco, Calif., model H-04172-00. The copolymer can function as a binder for the carbon in the anode.

A graphite mixture can be prepared separately by first adding 23.4 grams of graphite into 0.9 grams of carbon black into a solution containing 60 grams acetone, and 10.5 grams dibutyl phthalate. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willebroek, Belgium. The graphite mixture is then vigorously mixed in a high shear mixer until a substantially homogeneous blend is formed. A suitable mixer is available from Ross Model ME100DLX, Hauppauge, N.Y., operating at its highest setting (about 10,000 RPM) for 30 minutes. Optionally, a surfactant can be added to the graphite mixture to facilitate dispersion of the graphite. Preferred surfactants include Pluronic FC68™ from BASF, Mt. Olive, N.J. and Flurad 430™ from 3M Co., St. Paul, Minn.

The anode slurry can then be prepared by mixing the polymer mixture and the graphite mixture together under low shear conditions to form the anode slurry wherein the components are well mixed. A portion of the acetone is allowed to evaporate from the slurry before it was laminated onto the current collector. Anode films form when the remaining portion of the acetone evaporates.

EXAMPLE 3

A cathode current collector can be employed which is a sheet of expanded aluminum that is about 50 $\mu$m thick. The aluminum grid is available under the designation 2AL5-077 from Delker. The cathode slurry can be prepared as follows:

A polymer mixture comprising a copolymer Of polyvinylidene difluoride (PVDF) and hexafluoropropylene (HFP) can be prepared by mixing 4.4 grams of the copolymer in 15 ml of acetone. The copolymer may be Kynar Flex 2801™. The mixture can be stirred for about 24 hours in a milling jar.

A cathode mixture can be prepared separately by first adding 28.9 grams of $Li_2NiZrO_4$ (or an appropriate amount of some other lithiated zirconium, titanium or hafnium oxide), and 2–4 grams of carbon black (Super P) into a solution containing 60 grams acetone, and 8.7 grams dibutyl phthalate. The mixture may then be vigorously mixed in the a high shear mixer until a substantially homogeneous blend is formed. Optionally, a surfactant can be added to facilitate dispersion.

The cathode slurry may be prepared by mixing the polymer mixture and the cathode mixture together under low shear conditions to form the cathode slurry wherein the components are well mixed. A portion of the acetone is allowed to evaporate from the slurry before it is laminated onto the current collector. Cathode films form when the remaining portion of the acetone evaporates.

The above anode and cathode films can be formed directly on the current collector by laminating the slurry mixtures onto the current collector surfaces. Alternatively, each film can be prepared by first casting a slurry onto a substrate or carrier web and allowing the solvent to evaporate, thus leaving the film. Thereafter, the films can be laminated onto each side of the metal sheet.

EXAMPLE 4

A solid electrochemical cell may be prepared by first positioning a polymeric matrix between the anode and cathode and thereafter fusing the structures under moderate pressure and temperature (e.g., 130° C.) to form an electrochemical cell precursor. The pressure and temperature will depend on the polymer(s) forming the polymer matrix. The polymeric matrix may be formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which imparts toughness and strength to the film. In addition, it is believed that the $SiO_2$ assists the activation process by creating physico-chemical conditions such that the electrolyte solution quickly and completely fills the pores created by the extraction of the dibutyl phthalate. Preferably, the polymeric slurry is mixed under low shear conditions as not to degrade the copolymer.

It is preferred that in preparing the polymer mixture for both the anode and cathode slurries the polymer (or copolymer) not be subject to high shear so as to be degraded. Furthermore, it is preferred the polymer or copolymer employed has a high average molecular weight. Preferably the average molecular weight is between 50K to 750K, more preferably 50K to 200K, and most preferably 50K to 120K. Furthermore, it is preferred that the polymer or copolymer has a narrow molecular weight range; preferably $M_n/M_w=1.0$ Next the dibutyl phthalate plasticizer is extracted from the precursor. Extraction can be accomplished using conventional organic liquid solvents such as diethyl ether or by supercritical fluids which includes, for example, a gas compressed and heated to either supercritical or supercritical conditions to achieve liquid-like densities. Supercritical fluids are known in the art. See, for example, U.S. Pat. No. 5,013,366, 5,267,455, 4,219,333, 4,012,194, and 3,969,196, which are incorporated herein. A preferred supercritical fluid is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

EXAMPLE 5

Electrochemical cells wherein the cathode comprises the inventive lithiated zirconium, titanium or hafnium oxide and an anode comprised of lithium metal can be prepared as follows. Specifically, the cathode comprises $Li_2CuZrO_4$ or $Li_2FeZrO_4$ and EPDM as the binder, and the cathode slurry may be prepared as follows.

The cathode slurry can be prepared by combining sufficient cathode powder to provide for a final product having about 51.0 weight percent of the $Li_2CuZrO_4$ or $Li_2FeZrO_4$. The slurry can contain the following (in approximate weight percent):

| | |
|---|---|
| $Li_2CuZrO_4$ or $Li_2FeZrO_4$ | 52% |
| Carbon | 6.2% |
| EPDM (ethylene propylene diene monomer) | 1.8% |
| Xylene | 40.0% |
| | 100.% |

The method of preparing 100 grams of the cathode slurry is as follows:

1.8 grams of EPDM (Mooney viscosity of 26±5 and available as VISTALON™ 2504 (Exxon Chemicals Co., Houston, Tex.) are mixed with 16.2 grams of xylene to form a 10.0% (wt.) EPDM solution. The temperature is maintained at between 40°–45° C. as the EPDM is added to the xylene. The solution is preferably filtered through a 20 micron filter cartridge.

An amount of carbon powder sufficient to provide about 52 grams of $Li_2CuZrO_4$ or $Li_2FeZrO_4$ per 100 grams of cathode slurry and a sufficient amount of carbon (Shawinigan Black™) to provide about 6.2 grams of total carbon per 100 grams of slurry may be mixed in a double planetary mixer where the blend is stirred at 7.5 Hz and 25° C. The above EPDM-xylene solution is passed through 4A molecular sieves and then added to the $Li_2CuZrO_4$ or $Li_2FeZrO_4$ and carbon blend under vacuum mixing over a 5 minute period during which time an additional 23.8 grams of xylene are added. Afterwards, the mixing speed is increased from 7.5 to 20 Hz and maintained for another 5 minutes. Thereafter, the temperature of the mixture is gradually raised to 85° C. over about a 45 minute period and maintained at the elevated temperature for about 30 minutes. Next, the mixing speed is decreased to about 1 Hz and subsequently the temperature of the mixture is allowed to decrease gradually to about 45° C. over about a 30 minute period. Finally, the mixture is mixed for 5 minutes at this temperature.

The extruded cathode slurry is then coated to a substantially uniform thickness of about 25–200 μm, more preferably 50–100 μm, and most preferably about 100 μm, over the current collector by a doctor blade, Meyer-rod, or by reverse roll coating. The cathode slurry/current collector is heated to remove the xylene.

The electrolyte solvent will comprise a mixture of ethylene carbonate and dimethyl carbonate (67:33 ratio by weight) and 1 M $LiPF_6$. A separator comprising glass fibers can be employed. The anode, cathode, and separator of the electrochemical cell each would have a geometrical area of approximately 2.4 cm². It is believed that two electrode electrochemical voltage spectroscopy (EVS) studies, as described in "Three Electrode Electrochemical Voltage Spectroscopy (TEVS): Evaluation Of A Model Lithium Ion System", by J. Barker, *Electrochimica Acta*, Vol. 40, No. 11, pp. 1603–1608 (p. 1604), 1995, which is herein incorporated by reference, would allow one to define the thermodynamics and kinetics of the lithium insertion/extraction reactions in intercalation materials. For example, for $Li_2FeZrO_4$ the reaction envisioned is

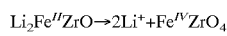
$Li_2Fe^{II}ZrO \rightarrow 2Li^+ + Fe^{IV}ZrO_4$

The specific capacity of the cathode realized will depend on how much $Li^+$ ion is extracted from the compounds.

The theoretical specific capacities for a number of lithiated oxide compounds used in accordance with the present invention are provided below:

| | Specific Capacity (mAh/g) | |
|---|---|---|
| Compound | 1 × Li removed | 2 × Li removed |
| $Li_2FeZrO_4$ | 119 | 238 |
| $Li_2VZrO_4$ | 121 | 242 |
| $Li_2NiZrO_4$ | 118 | 236 |
| $Li_2CoZrO_4$ | 118 | 236 |
| $Li_2FeHfO_4$ | 86 | 172 |
| $Li_2VHfO_4$ | 87 | 175 |
| $Li_2NiHfO_4$ | 85 | 170 |
| $Li_2FeTiO_4$ | 147 | 295 |
| $Li_2VTiO_4$ | 151 | 302 |
| $Li_2NiTiO_4$ | 145 | 290 |

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A composite cathode comprising a lithiated zirconium, titanium or hafnium oxide composition, a polymeric binder, and carbon, with the oxide composition having the formula $Li_2MXO_4$, where M is a transition metal, or a mixture of transition metals, and X is zirconium, or hafnium.

2. The composite cathode of claim 1, wherein M is Ni, Co, Fe, Mn, V, Cu or Cr, or a mixture thereof.

3. The composite cathode of claim 1, wherein X is zirconium.

4. The composite cathode of claim 1, wherein M is Ni, V, Co, Fe, Cu or Mn and X is zirconium.

5. A secondary electrochemical cell which comprises:
 a solvent containing electrolyte interposed between an anode composed of anodic material and cathode composed of cathodic material wherein said electrolyte comprises an inorganic ion salt and a solid polymeric matrix and wherein said cathodic material comprises $Li_2MXO_4$, where M is a transition metal, or a mixture of transition metals, and X is zirconium, or hafnium.

6. The secondary electrochemical cell according to claim 5, wherein said cell has an operating voltage of at about 4 volts or greater.

7. The secondary electrochemical cell according to claim 5, wherein said anode comprises a carbon material selected from carbon black, coke, graphite, or mixtures thereof.

8. The secondary electrochemical cell according to claim 5, wherein said anode comprises an intercalation carbon anode.

9. The secondary electrochemical cell according to claim 5, wherein M is Ni, Co, Fe, Mn, V, Cu or Cr, or a mixture thereof.

10. The secondary electrochemical cell according to claim 9, wherein X is zirconium.

11. The secondary electrochemical cell according to claim 5, wherein X is zirconium.

12. A secondary electrochemical cell comprising an anode, a cathode, and interposed therebetween a solid electrolyte comprising a solid polymeric matrix, a solvent electrolyte, and an inorganic salt, wherein the cathode comprises $Li_2MXO_4$, where M is a transition metal or a mixture of transition metals, and X is zirconium, or hafnium.

13. The secondary electrochemical cell of claim 12, wherein M is Ni, Co, Fe, Mn, V, Cu or Cr, or a mixture thereof.

14. The secondary electrochemical cell of claim 12, wherein X is zirconium.

15. The secondary electrochemical cell of claim 14, wherein M is Ni, V, Co, Fe, Cu or Mn, or a mixture thereof.

16. The composite cathode of claim 1, wherein X is hafnium.

17. The secondary electrochemical cell of claim 5, wherein X is hafnium.

18. The secondary electrochemical cell of claim 12, wherein X is hafnium.

19. A composite cathode comprising a lithiated titanium oxide composition, a polymeric binder, and carbon, with the oxide composition having the formula $Li_2MXO_4$, where M is Ni, Co, Fe, Cu, Cr, or a mixture thereof, and X is titanium.

20. A secondary electrochemical cell which comprises:
 a solvent containing electrolyte interposed between an anode composed of anodic material and a cathode composed of cathodic material wherein said electrolyte comprises an inorganic ion salt and a solid polymeric matrix and wherein said cathodic material comprises $Li_2MXO_4$, where M is Ni, Co, Fe, Cu, Cr, or a mixture thereof, and X is titanium.

21. A secondary electrochemical cell comprising an anode, a cathode, and interposed therebetween a solid electrolyte comprising a solid polymeric matrix, a solvent electrolyte, and an inorganic salt, wherein the cathode comprises $Li_2MXO_4$, where M is Ni, Co, Fe, Cu, Cr or a mixture thereof, and X is titanium.

* * * * *